United States Patent [19]

Baker et al.

[11] Patent Number: 5,141,203
[45] Date of Patent: Aug. 25, 1992

[54] SNUBBER FOR A MACHINERY SUPPORTING FOUNDATION

[75] Inventors: Jennifer A. Baker; Alvin H. Nakagawa, both of San Jose; Christy L. Kirchner, Sunnyvale, all of Calif.

[73] Assignee: Westinghouse Electric Corp., Pittsburgh, Pa.

[21] Appl. No.: 658,500

[22] Filed: Feb. 21, 1991

[51] Int. Cl.⁵ ............................................. F16M 1/00
[52] U.S. Cl. .................................... 248/638; 248/635
[58] Field of Search .............. 248/638, 581, 636, 659, 248/635, 609; 267/140.4, 141.1, 148

[56] References Cited

U.S. PATENT DOCUMENTS

| | | | |
|---|---|---|---|
| 2,117,919 | 5/1938 | Summers | 248/581 |
| 4,065,082 | 12/1977 | Oota | 248/659 |
| 4,306,708 | 12/1981 | Gassaway et al. | 248/635 X |
| 4,711,135 | 12/1987 | Horiuchi et al. | 248/638 X |
| 4,720,075 | 1/1988 | Peterson et al. | 248/634 X |
| 4,858,880 | 8/1989 | Durand | 248/635 |
| 4,892,051 | 1/1990 | Taylor et al. | 248/581 X |
| 4,913,410 | 4/1990 | Marshall | 248/638 |

Primary Examiner—Karen J. Chotkowski
Attorney, Agent, or Firm—D. Schron

[57] ABSTRACT

A snubber arrangement which connects to a composite hollow beam structure without requiring the penetration of the composite material. The snubber includes an attachment assembly having first and second metallic outer layer bonded to an inner layer of composite material, with one of the outer layers being in intimate bonded contact with a surface of the composite hollow beam. A threaded insert in the attachment assembly receives a bolt around which a multipart spool is located. The hollow beam is mounted on a support structure and the spool has upper and lower flange portions which are located on either side of an aperture within the support structure such that the spool is maintained in position to limit excessive movement of the composite structure to which the snubber is attached.

14 Claims, 6 Drawing Sheets

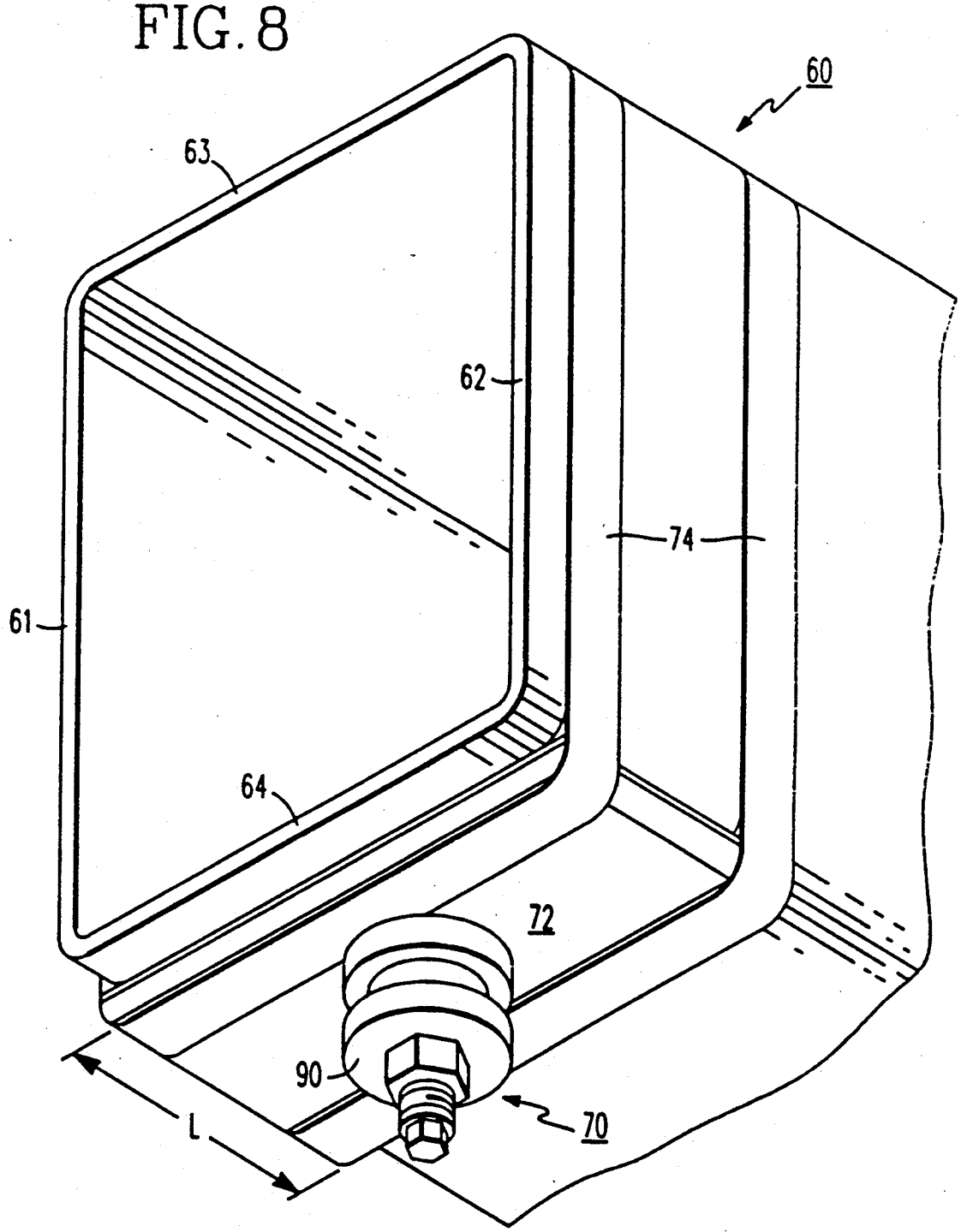

SNUBBER FOR A MACHINERY SUPPORTING FOUNDATION

BACKGROUND OF THE INVENTION

1. Field of the Invention

The invention in general relates to structural supporting members, and particularly to a snubber for limiting movement of a machinery foundation.

2. Background Information

Machinery such as turbines, generators, gearing, and the like, used in ocean going vessels, are generally mounted on a foundation, sometimes known as a subbase, with the foundation in turn being mounted on a support structure such as a girder or beam arrangement.

In addition to the use of individual mounting members which isolate the foundation from the supporting structure, the mounting arrangement may also include a plurality of snubber members which serve to limit amplitude movements during acceleration, deceleration or under shock conditions.

One common type of foundation which may be found on ocean going vessels is made up a plurality of legs or segments, each having the general form of a hollow box beam and fabricated from a metal such as steel. Installation of each snubber used involves the cutting away of a portion of the base of the foundation to accommodate the snubber parts.

In order to reduce the weight of the foundation while still maintaining sufficient load bearing capabilities, composite materials have been proposed for use as the foundation. Composite materials, however, are more sensitive to stress concentrations than steel and a removal of a relatively large amount of material in the base to accommodate snubber parts would cause various stresses leading to an unacceptable decrease in the composite foundation load bearing capability.

The present invention provides for a snubber arrangement for a composite foundation which eliminates the requirement for penetrating the base of the foundation to accommodate snubber parts, thereby eliminating detrimental stresses which would normally be caused by the aperture.

SUMMARY OF THE INVENTION

In its broad aspect, the snubber arrangement of the present invention includes an attachment assembly which is bonded to a surface of a foundation structure mounted on and spaced from a support structure. A post attached to and extending from the snubber attachment assembly extends past the surface of the support structure through an aperture therein. The post carries a snubber device which includes a resilient portion and which is adapted to contact the support structure to limit amplitude of movement of the foundation under conditions which cause the movement.

In one embodiment, the foundation is formed as a hollow composite structure which includes side, top and bottom walls and wherein the foundation is mounted on a support, such as may be utilized in an ocean going vessel, and which support includes a portion having an aperture therethrough. The snubber attachment assembly is a sandwich having first and second outside layers with at least one intermediate layer and with the first layer being in intimate bonded contact with the bottom wall of the foundation. The intermediate layer is preferably of a composite material and may include fibers which extend in both a horizontal as well as a vertical direction.

A post is connected to the snubber attachment assembly such as by threaded engagement with an insert and the post extends through the aperture in the support. The arrangement includes a spool assembly which surrounds the post and has an upper flange portion disposed above the aperture in the support and a lower flange portion disposed below the aperture, with the flange portions having a greater diameter than that of the aperture. The spool assembly may include upper and lower separable metallic portions as well as upper and lower separable resilient portions coaxial with respective upper and lower metallic portions.

BRIEF DESCRIPTION OF THE DRAWINGS

FIG. 8 is a view of the base of the foundation with attached snubber arrangement.

BRIEF DESCRIPTION OF THE PREFERRED EMBODIMENTS

Figure 1:
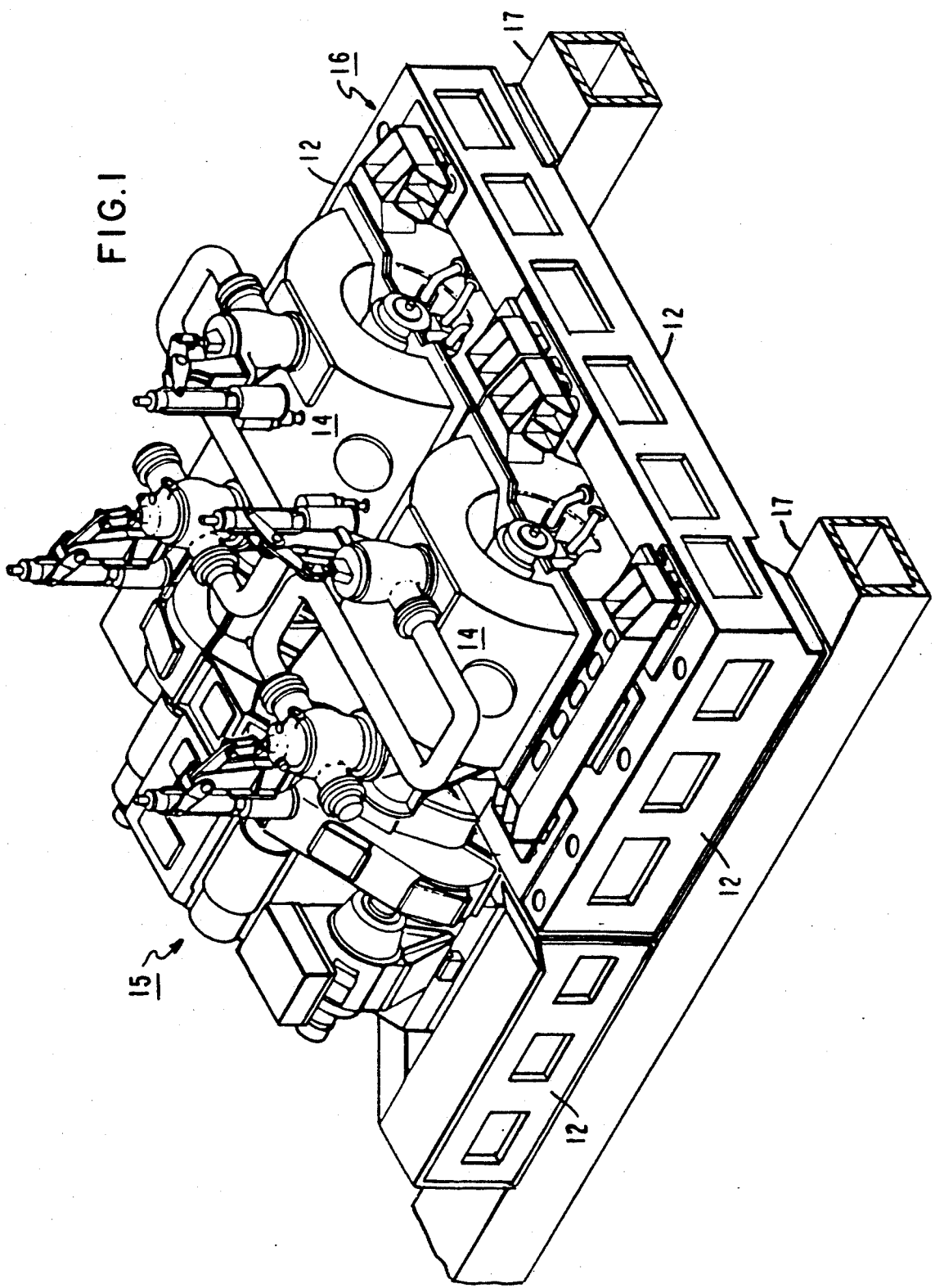
FIG. 1 illustrates a machinery foundation formed of hollow beam segments.

The invention will be described by way of example with respect to structures utilized in conjunction with marine propulsion, a typical example of which is illustrated in FIG. 1. A machinery foundation 10, also known as a subbase, includes a plurality of leg segments 12 utilized for supporting turbines 14 and reduction gearing apparatus 15.

The foundation 10 is mounted on, and supported by, a support structure which for marine vessels typically takes the form of box girders 17 or other support structures capable of supporting the weight of the foundation and machinery.

Figure 2:
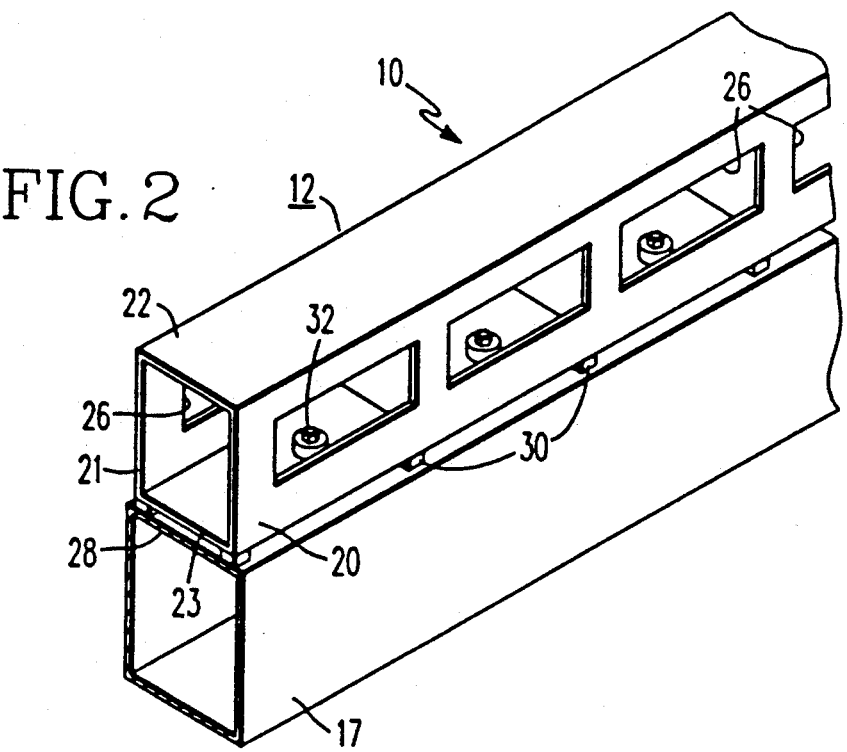
FIG. 2 illustrates a portion of a supported hollow beam member.

A typical leg segment 12 of the foundation structure, as further illustrated in FIG. 2, is in the form of a hollow beam which includes a plurality of wall portions 20 to 23. Wall portions 20 and 21 constitute side walls and include a plurality of apertures 26 provided to reduce the overall weight of the structure as well as to serve as access apertures to the machinery.

Leg segment 12 of the foundation structure is supported on the top 28 of the box girder 17 by a series of resilient mounts 30.

The mounting arrangement additionally includes a plurality of snubbers 32 which are mounted in such manner as to allow small displacements of the foundation 10 under normal operating conditions without limiting contact being made with the box girder 17. However, under shock or acceleration/deceleration conditions, excessive amplitude excursions of the foundation 10 will be limited.

Figure 3:
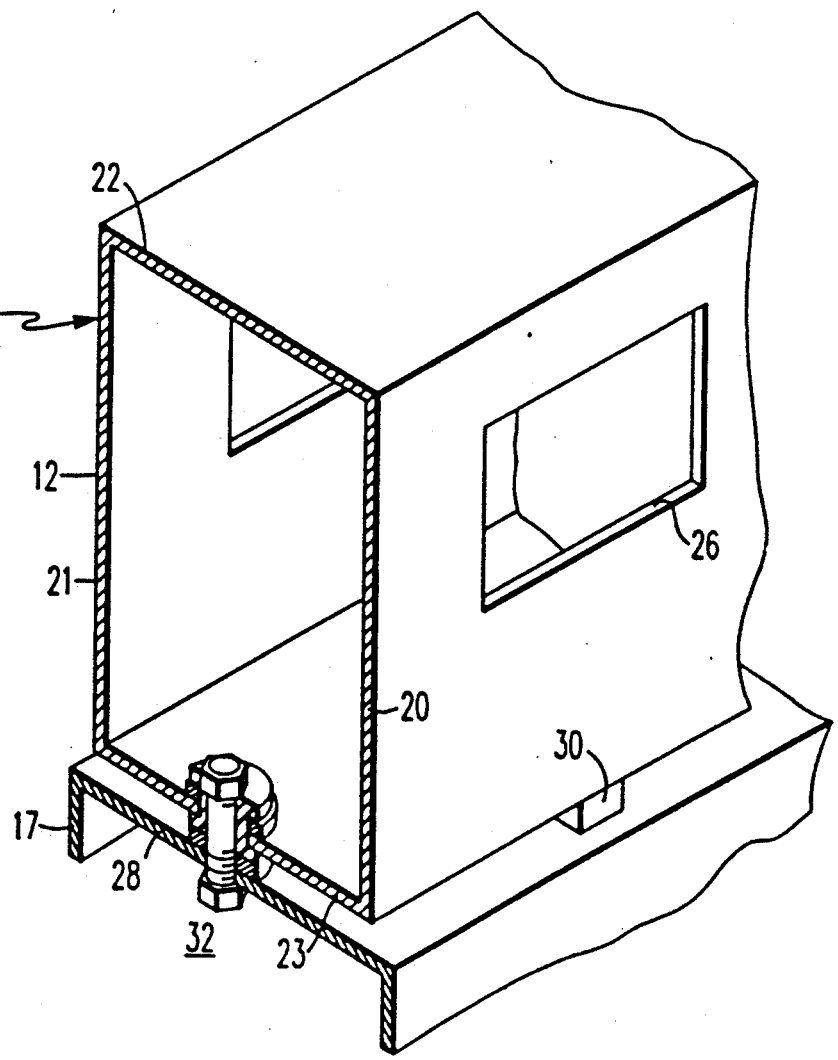
FIG. 3 is a sectional perspective view of a prior art snubber arrangement for a steel foundation.
Figure 4:
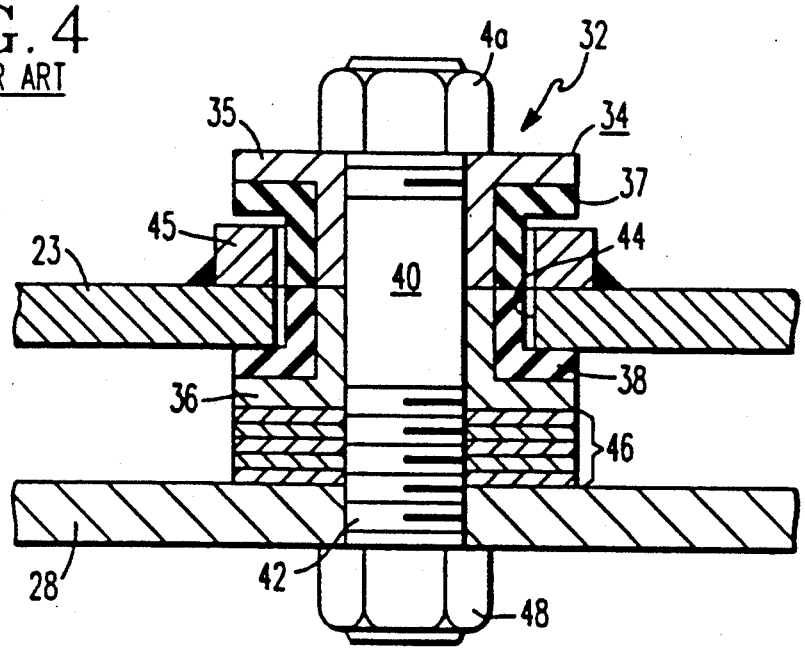
FIG. 4 is a more detailed cross-sectional view of the snubber of FIG. 3.

A typical prior art snubber arrangement relative to the foundation structure 10 and box girder 17 is illustrated in FIG. 3, and details of the snubber are illustrated in FIG. 4. The snubber 32 extends between the top 28 of the box girder 17 and the bottom 23 of the foundation 10. As best seen in FIG. 4, the snubber 32 includes a spool arrangement 34 having a top portion 35 and a bottom portion 36 made of a material such as steel, and further includes a coaxial top portion 37 and bottom portion 38 made of a resilient material such as rubber.

The spool arrangement 34 is held in position by means including a threaded post or stud 40 which extends through an aperture 42 in the top 28 of the box girder and of a diameter to accommodate the post. Post 40 also extends through an aperture 44 in the bottom 23 of the foundation and of a diameter to accommodate the central portion of the spool arrangement 34. A circular socket 45 such as of steel, welded in place around the aperture 44, reinforces the bottom portion 23 and serves as a stop or limit for relative downward movement of the upper portions of the spool arrangement 34. A series of shims 46 vertically position the spool arrangement 34 to a proper height where it is in a non-contacting relationship with the foundation, and the assembly is held in place by means of nuts 48 and 49 threadedly engaged with the post 40.

The steel foundations utilized in ocean going vessels are massive and extremely heavy. In order to meet lighter weight requirements, consideration is being given to fabricating the foundation structures from composite materials which are created from a combination of very strong fibers in an appropriate matrix material such as epoxy resin. Such composites meet the strength requirements for a foundation at a fraction of the weight of the material generally utilized. To use the snubber arrangement of FIG. 4, however, with a composite foundation would require the formation of an aperture (44) in the bottom of the foundation and which aperture can be as wide as one-third of the width of the bottom wall of the foundation. Composites are more sensitive to stress concentrations and have significantly lower out-of-plane strengths than metals. Accordingly, the removal of composite material to make an aperture for a snubber would cause various stresses which would exceed the composite foundation load bearing capability. The present invention provides for a snubber arrangement for a composite foundation structure wherein the design completely eliminates stress-causing penetrations into the foundation. One embodiment of the invention is illustrated in FIGS. 5 through 8.

Figure 5:
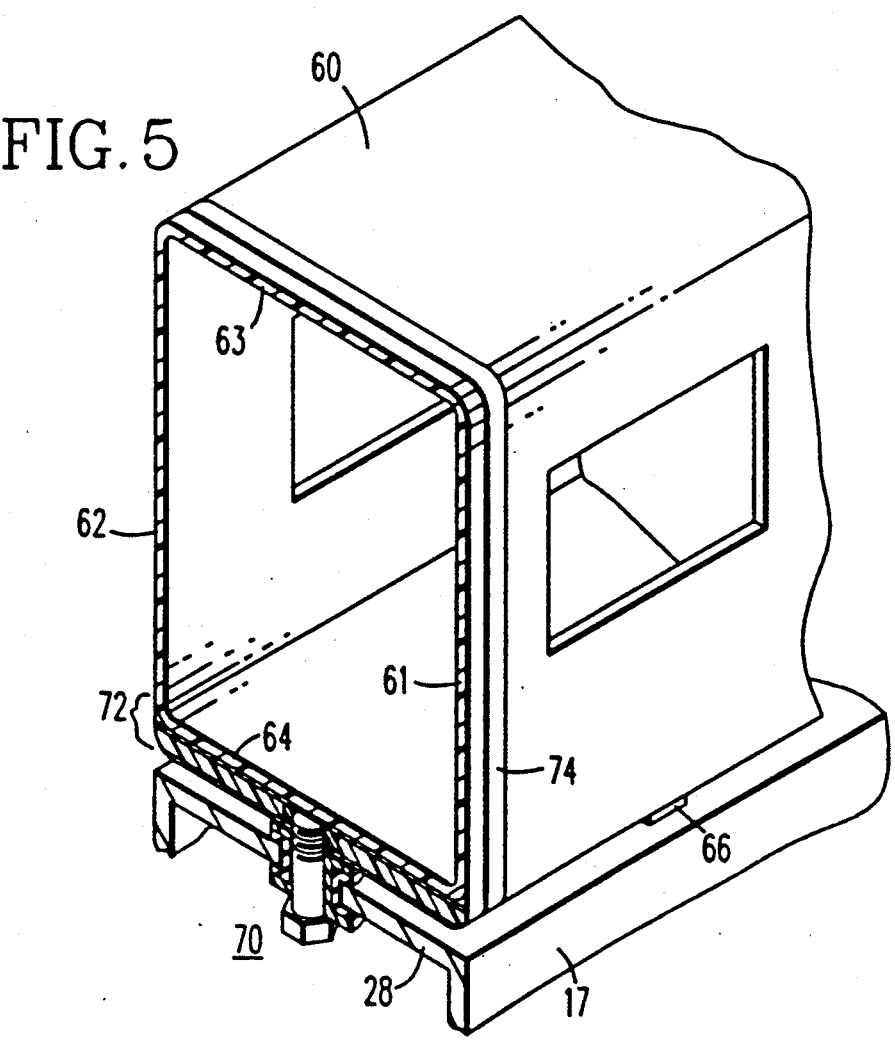
FIG. 5 is a sectional perspective view of one embodiment of the present invention.

In FIG. 5 a portion of a foundation structure is illustrated and includes a hollow beam leg segment 60 made of lightweight composite material and having sidewalls 61 and 62, as well as top and bottom walls 63 and 64. The leg segment is supported on box girder 17 by a series of resilient mounts, of which one, 66, is illustrated, with the mounting system additionally including a snubber arrangement 70. The snubber arrangement 70 includes a snubber attachment assembly 72 which is in intimate bonded contact with the bottom wall 64 of the segment 60. In addition to the bonding, the snubber attachment assembly 72 may also be firmly secured by strapping means of which one strap 74 is illustrated in FIG. 5 and which may be filament wound around the composite hollow beam structure 60.

Figure 6:
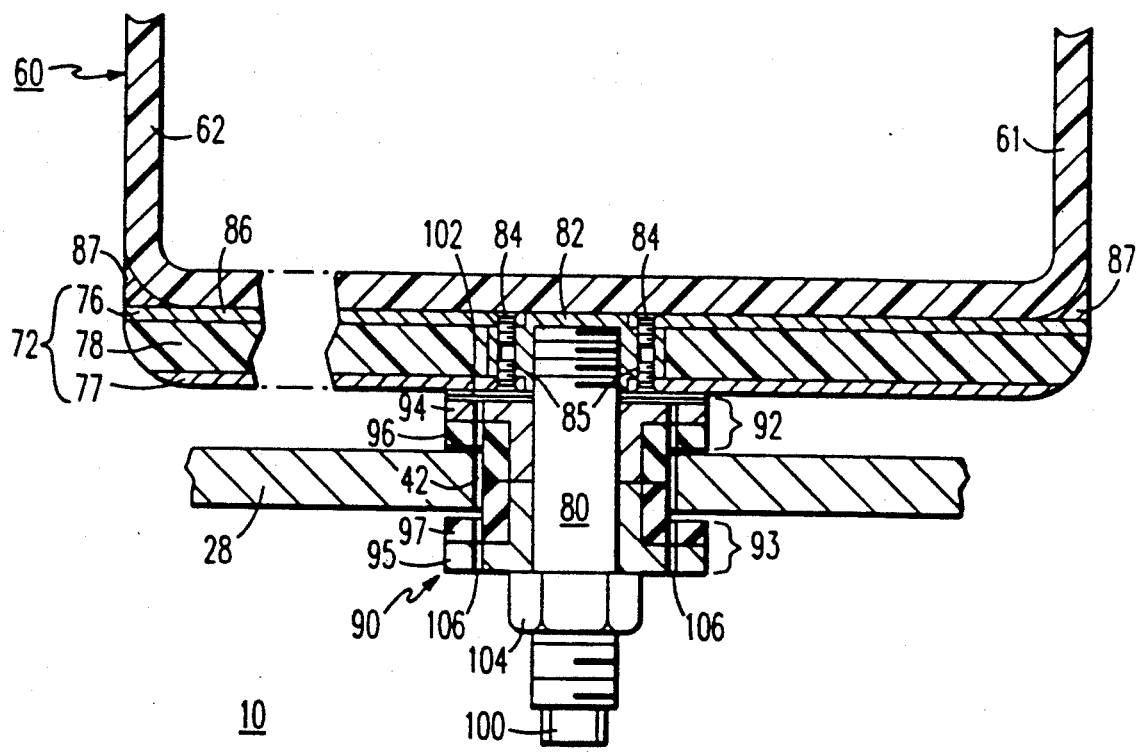
FIG. 6 is a more detailed cross-sectional view of the snubber arrangement of FIG. 5.
Figure 7:
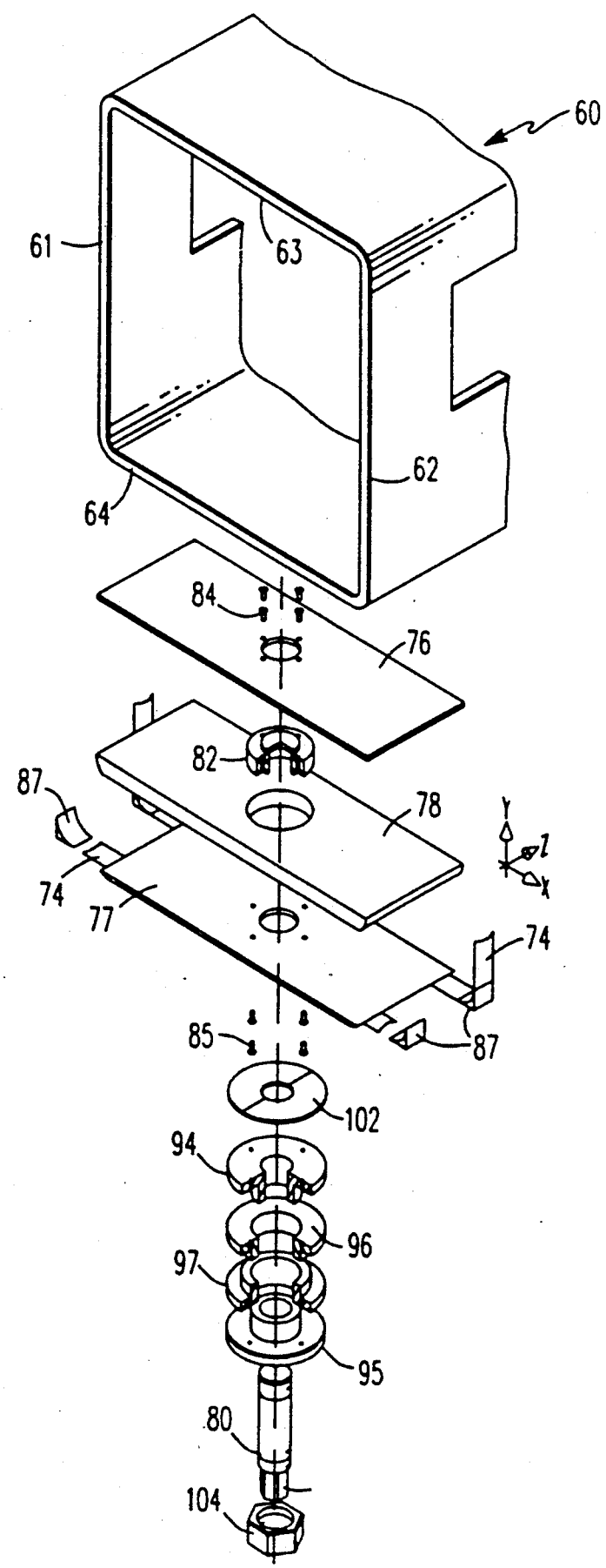
FIG. 7 is an exploded view of the snubber arrangement.

Details of the snubber arrangement are further illustrated in FIG. 6 and the exploded view of FIG. 7. Although the snubber attachment assembly 72 can be fabricated from one piece of material, in a preferred embodiment the assembly is a sandwich construction which includes first and second outside layers 76 and 77 with at least one intermediate layer 78. The outside layers may be of steel or titanium and in order to provide for strength and stiffness in both the horizontal and vertical directions, the intermediate layer 78 may be a composite material having fibers oriented along X, Y and Z axes in a resin system such as epoxy. Alternatively, the intermediate layer may be a composite made up of alternate fiber and matrix systems to maximize shock mitigation, strength and stiffness properties.

The arrangement includes a threaded post 80 connected to the snubber attachment assembly 72 and which attachment may be accomplished with the provision of an internally threaded insert 82. During fabrication, the top portion of insert 82 may be inserted into an aperture in layer 76 and held in position by means of screws 84. Thereafter, the intermediate layer 78 having a central aperture to accommodate the insert 82 may be bonded to layer 76 and thereafter the bottom outside layer 77, having an aperture to accommodate the bottom of insert 82 may be bonded in place and additionally secured to the insert 82 by means of screws 85. The snubber attachment assembly 72 may then be bonded to the outside surface 86 of the bottom wall 64 and if desired, held in place by means of straps 74, for example filament wound onto the segment 60. Spacer strips 87 are applied prior to strap installation. The spacer strips 87 provide a smooth transition between the bottom wall 64 and the side wall 61 and 62.

The snubber additionally includes a spool arrangement 90 similar to that conventionally used and including an upper circular flange portion 92 which is disposed above aperture 42 in the top 28 of the box girder, and a lower circular flange portion 93 disposed below the aperture 42, with the flange portions having a greater diameter than that of aperture 42. The spool arrangement 90 includes separable top and bottom portions 94 and 95 which may be of steel, as well as a concentric spool of a resilient material such as rubber made up of separable top and bottom portions 96 and 97.

During installation, post 80 may be threadedly engaged with the internally threaded insert 82 by means of a tool applied to the hex head 100 at the end of post 80. Prior to being positioned on the box girder, a series of spacing shims 102 may be placed around post 80 and the upper portion of the spool arrangement 90 placed in position around the post 80. The spacing shims 102 may be of split configuration to assist in installation.

When the foundation is lowered into position, post 80 will extend through aperture 42 and thereafter the lower portion of the spool arrangement 90 may be placed in position and secured in place by means of a nut 104. In order to maintain the central portion of the spool arrangement 90 in a spaced orientation so that it does not touch the walls of aperture 42, the spool arrangement has longitudinal apertures 106 therethrough to receive spacing rods which are thereafter removed in the same manner as the prior art.

As best seen in FIG. 8, which is a view of the underside of the structure 60, it is seen that the snubber attachment assembly 72, bonded to the outside surface of bottom wall 64 and further held in position by straps 74 is of a longitudinal dimensional L such that a large total contact area of the snubber attachment assembly is provided with the bottom wall 64 thereby serving to distribute the loading over a relatively larger area of the foundation.

We claim:

1. A snubber arrangement for a hollow composite structure including side, top and bottom walls and used as a portion of a foundation for machinery and wherein said foundation is mounted on a support having a portion with an aperture therethrough, comprising:
   a) a snubber attachment assembly having first and second outside layers and at least one intermediate layer therebetween;
   b) said first layer being in intimate bonded contact with said bottom wall of said foundation;
   c) a post attached to said snubber attachment assembly and extending through said aperture in said support;
   d) a spool assembly having a central axis and surrounding said post and having an upper circular flange portion disposed above said aperture of said support and a lower circular flange portion disposed below said aperture of said support, said flange portions having a greater diameter than that of said aperture in said support; and
   e) means for holding said spool assembly on said post.

2. Apparatus according to claim 1 wherein:
   a) said outside layers of said snubber attachment assembly are of metal.

3. Apparatus according to claim 1 wherein:
   a) said intermediate layer of said snubber attachment assembly is of a composite material.

4. Apparatus according to claim 3 wherein:
   a) said composite material includes fibers oriented in both a horizontal as well as a vertical direction.

5. Apparatus according to claims 1 or 3 which includes:
   a) an insert positioned within said snubber attachment assembly and secured to at least one of said outside layers;
   b) said post being carried by said insert.

6. Apparatus according to claim 5 wherein:
   a) said insert includes a threaded receptacle therein;
   b) said post being threaded into said receptacle.

7. Apparatus according to claim 6 wherein:
   a) said means for holding said spool assembly on said post is a nut threaded onto said post.

8. Apparatus according to claim 1 wherein:
   a) said spool assembly includes an upper portion and a separable lower portion both of metal, and an upper portion and separable lower portion both of resilient material;
   b) said upper and lower portions of resilient material being coaxial with said upper and lower portions of metal.

9. Apparatus according to claim 8 wherein:
   a) said spool assembly includes a plurality of apertures therein extending parallel to said central axis for receipt of respective rods to center said spool assembly within said aperture of said support.

10. Apparatus according to claim 1 which includes;
    a) strapping means positioned to additionally secure said snubber attachment assembly to said hollow composite structure.

11. Apparatus according to claim 10 wherein:
    a) said strapping means contacts said second layer of said snubber attachment assembly and encircles said top bottom and side walls of said hollow composite structure.

12. Apparatus according to claim 11 wherein:
    a) said strapping means is filament wound around said hollow composite structure.

13. Apparatus according to claim 10 wherein:
    a) said strapping means is bonded to said snubber attachment assembly and said top and side walls of said hollow composite structure.

14. Apparatus according to claim 10 wherein:
    a) said strapping means is comprised of two straps, one on either side of said spool assembly.

* * * * *